Patented Dec. 28, 1948

2,457,329

UNITED STATES PATENT OFFICE 2,457,329

POLYMERS OF 9,10 - EPOXYOCTADECANOL AND PROCESSES FOR THEIR PREPARATION

Daniel Swern and Geraldine N. Billen, Philadelphia, Pa., assignors to the United States of America as represented by the Secretary of Agriculture No Drawing. Application September 27, 1946, Serial No. 699,647

17 Claims. (Cl. 260—348)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to polymeric compounds, and more particularly, to compounds formed by the polymerization of 9,10-epoxyoctadecanols, and it has among its objects the provision of new compositions of matter, namely, polymerized 9,10 epoxyoctadecanols, together with processes for their preparation. Other objects and advantages will be apparent from the description of the invention.

We have found that 9,10-epoxyoctadecanols, which contain an oxirane ring, that is, the atomic grouping

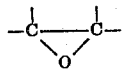

and which are compounds represented by the following formula

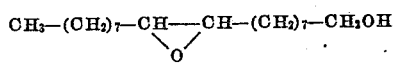

undergo polymerization when subjected to heat treatment.

The 9,10-epoxyoctadecanols are difunctional compounds containing both the oxirane ring and a hydroxyl group within the same molecule, and it appears likely, therefore, that on polymerization, long-chain, polyether type compounds are formed wherein the recurring structural units may be linked to either the ninth or tenth carbon atom of the monomer radicals, as illustrated, for example, by the following mechanism which shows linkage to the tenth carbon atom:

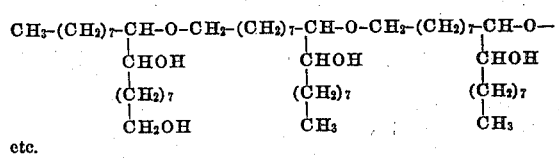

etc.

In general, the structure of the resulting products may be illustrated by the following generic formula:

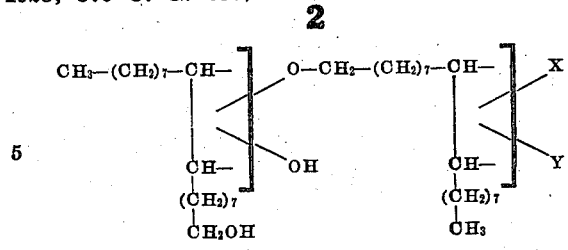

wherein X and Y together may represent an oxirane oxygen as, for example, in the formation of the dimer. Or, X may represent a hydroxy radical, in which event Y will represent a radical of the formula

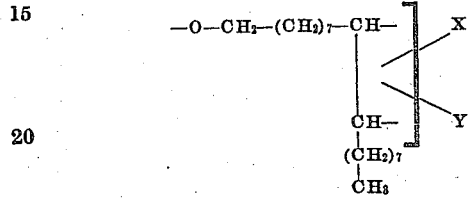

wherein X and Y will have the same significance as above, the products being polymers of higher order than the dimer.

The two stereoisomeric 9,10-epoxyoctadecanols having melting points of 54° and 48° C., respectively, and which may be used singly or in combination for the production of polymers in accordance with our invention, can be prepared by various methods. For example, these 9,10-epoxyoctadecanols can be prepared by epoxidizing oleyl alcohol (cis-9,10-octadecanol) and elaidyl alcohol (trans-9,10-octadecanol) with perbenzoic acid in acetone solution in the manner described by Swern in his application filed December 8, 1944, Serial No. 567,297, now patent No. 2,411,762. As illustrative of the preparation of the 9,10-epoxyoctadecanol having a melting point of 54° C., the afore-mentioned Swern process can be carried out as follows:

To 3140 ml. of an acetone solution containing 138 grams of perbenzoic acid, there is added, at 0° to 5° C., 274 grams of oleyl alcohol. The solution is then allowed to stand for about 40 hours at room temperature and is then cooled to approximately −25° C. The precipitate thus obtained, comprising mainly 9,10-epoxyoctadecanol, is filtered off and dried, yielding 247 grams of a material that melts at 54° to 55.5° C.

The 9,10-epoxyoctadecanols can also be prepared by epoxidizing the respective cis- or trans-9,10-octadecenol with peracetic acid in acetic acid solution, according to the process described by Findley and Swern in their application filed January 30, 1945, Serial No. 575,316. As illustrative of the preparation of the 9,10-epoxyoctadecanol having the melting point of 48° C., the afore-mentioned Findley and Swern process can be carried out as follows:

To 350 ml. of an acetic acid solution containing 0.29 mol of peracetic acid there is added, gradually and with vigorous agitation, 65 grams of elaidyl alcohol, while maintaining the temperature of the reaction mixture at approximately room temperature by means of external cooling. Stirring is continued for about 5 hours at room temperature. The reaction mixture is then diluted with ice water, filtered, and the precipitate, comprising mainly 9,10-epoxyoctadecanol, is washed free of acetic acid. There is obtained 69 grams of 9,10-epoxyoctadecanol which, on recrystallization from acetone, melts at 48° C.

According to the process of the invention, a 9,10-epoxyoctadecanol is heated at a polymerizing temperature of about from 55° to 200° C., preferably about from 90° to 100° C., until a polymer, having an oxirane oxygen content below the oxirane oxygen content of the starting 9,10-epoxyoctadecanol, is produced.

The rate of the polymerization reaction may be accelerated by subjecting the 9,10-epoxyoctadecanols to heat treatment in the presence of polymerization catalysts which may be either alkaline catalysts, such as sodium hydroxide, sodium methylate, and trimethylamine, or acidic catalysts such as sulfuric acid and naphthalene-β-sulfonic acid. We prefer to use an acidic polymerization catalyst such as naphthalene-β-sulfonic acid because it is readily dispersible in the solid monomers, is miscible with the molten monomers as well as with the polymeric reaction products, does not adversely affect the color of the polymeric material, and is readily removed therefrom by extraction with water.

As an illustrative embodiment of a manner in which our invention may be carried out in practice, the following example is given:

Approximately 2 percent, by weight, of naphthalene-β-sulfonic acid is intimately and separately mixed with the 9,10-epoxyoctadecanols having melting points of 54° and 48° C., respectively. The respective mixtures so obtained are heated in a constant temperature bath until polymerization is complete, as indicated by periodic analyses for oxirane oxygen, for example, according to the method described by Nicolet and Poulter (J. Am. Chem. Soc. 52, 1186 (1930)), and determination of the refractive index taken at 60° C. for the yellow sodium line ($[n]_D^{60°}$). The results obtained are shown in the following tabulation of the experimental data:

| Monomer used | 9,10-Epoxyoctadecanol, M. P. 54° C. | | | | 9,10-Epoxyoctadecanol, M. P. 48° C. | | | |
| --- | --- | --- | --- | --- | --- | --- | --- | --- |
| Polymerization temperature | 90° | | 100° | | 90° | | 100° | |
| Time in hours | Oxirane Oxygen, Per Cent | $[n]_D^{60°}$ | Oxirane Oxygen, Per Cent | $[n]_D^{60°}$ | Oxirane Oxygen, Per Cent | $[n]_D^{60°}$ | Oxirane Oxygen, Per Cent | $[n]_D^{60°}$ |
| 0 | 5.5 | 1.445 | 5.5 | 1.445 | 5.6 | 1.443 | 5.6 | 1.443 |
| 2 | 4.6 | 1.450 | 4.6 | 1.450 | 4.5 | 1.447 | 4.8 | 1.448 |
| 4 | 4.3 | 1.451 | 4.2 | 1.450 | 4.6 | 1.448 | 4.3 | 1.449 |
| 8 | 3.5 | 1.453 | 3.0 | 1.454 | 4.2 | 1.450 | 3.7 | 1.451 |
| 16 | 2.4 | 1.456 | 1.4 | 1.459 | 3.3 | 1.453 | 2.2 | 1.456 |
| 32 | 0.3 | 1.463 | 0.0 | 1.462 | 2.3 | 1.457 | 0.3 | 1.464 |
| 64 | 0.0 | 1.463 | | | 0.3 | 1.464 | 0.2 | 1.464 |

The viscosity of the treated materials gradually increases as the polymerization proceeds. The polymeric products obtained under identical conditions from the two stereoisomers of the 9,10-epoxyoctadecanols are substantially alike, and depending upon the degree of polymerization, are colorless to pale yellow viscous oils or semi-solid products having the consistency of petrolatum. The polymerized products are insoluble in water and petroleum naptha (hexane fraction), and are soluble in diethyl ether, ethanol, propanol, ethyl acetate, ethylene dichloride, benzene, acetone, and methyl ethyl ketone.

The polymerization process may be continued until the oxirane oxygen content of the polymeric material has been reduced to below about 0.2 percent, or interrupted at any intermediate stage, depending upon the desired properties of the final product.

The polymerization catalyst can be eliminated from the polymerized material by dissolving the latter in a suitable water-immiscible solvent, such as benzene or diethyl ether, and then washing the solution so obtained with water or aqueous alkali.

The products obtainable by polymerization of 9,10-epoxyoctadecanols are stable toward hydrolysis and possess properties which render them useful as plasticisers, as components of cosmetics and creams, and as viscosity-index improving agents for lubricants.

Since these polymers still contain hydroxy groups, they are capable of undergoing reactions typical of compounds containing such a group. Thus, for example, they yield esters with acids, and on treatment with sulfating agents, they are converted into compounds possessing surface-active properties.

Although we prefer to conduct the polymerization process at a temperature of about from 90° to 100° C., the temperature conditions may vary considerably to suit the size of the batch and the nature of the final product. Satisfactory results may be attained within a temperature range of about from 55° to 200° C. In general, lower temperatures and polymerization in the absence of a catalyst decrease the rate of the polymerization process.

In the operation of the process, it is not necessary to utilize highly purified monomers. Thus, satisfactory polymers can be obtained by using as the starting material the products obtained by epoxidation of the 9,10-octadecanols without subjecting these materials to recrystallization.

Having thus described our invention, we claim:
1. A compound of the general formula

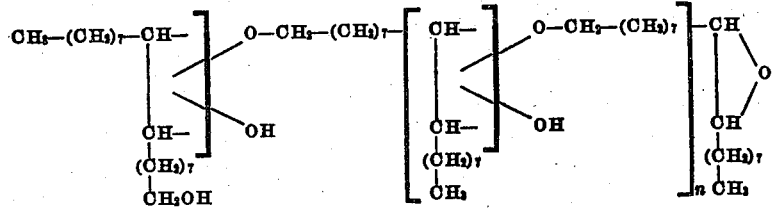

where $n$ is zero or any integer.

2. A polymerized 9,10-epoxyoctadecanol having an oxirane oxygen content below that of the monomeric 9,10-epoxyoctadecanol.

3. A polymerized 9,10-epoxyoctadecanol having an oxirane oxygen content of not more than about 0.3 percent.

4. A polymerized 9,10-epoxyoctadecanol having an oxirane oxygen content below that of the monomeric 9,10-epoxyoctadecanol, and having an index of refraction taken at 60° C. with the yellow sodium line above that of the monomeric 9,10-epoxyoctadecanol.

5. A polymerized 9,10-epoxyoctadecanol having an oxirane oxygen content of not more than about 0.3 percent, and having an index of refraction taken at 60° C. with the yellow sodium line of not less than 1.462.

6. A process comprising heating a 9,10-epoxyoctadecanol at polymerizing temperature until a polymer having an oxirane oxygen content below that of the 9,10-epoxyoctadecanol is produced.

7. A process comprising heating a 9,10-epoxyoctadecanol at a polymerizing temperature of about from 55° to 200° C. until a polymer having an oxirane oxygen content below that of the 9,10-epoxyoctadecanol is produced.

8. A process comprising heating a 9,10-epoxyoctadecanol at a polymerizing temperature of about from 90° to 100° C. until a polymer having an oxirane oxygen content below that of the 9,10-epoxyoctadecanol is produced.

9. A process comprising heating a 9,10-epoxyoctadecanol at a polymerizing temperature in the presence of naphthalene-β-sulfonic acid until a polymer having an oxirane oxygen content below that of the 9,10-epoxyoctadecanol is produced.

10. A process comprising heating a 9,10-epoxyoctadecanol having a melting point of 54° C. and an oxirane oxygen content of 5.5 percent at polymerizing temperature until a polymer having an oxirane oxygen content substantially below 5.5 percent is produced.

11. A process comprising heating a 9,10-epoxyoctadecanol having a melting point of 54° C. and an oxirane oxygen content of 5.5 percent at a polymerizing temperature of about from 90° to 100° C. until a polymer having an oxirane oxygen content substantially below 5.5 percent is produced.

12. A process comprising heating a 9,10-epoxyoctadecanol having a melting point of 54° C. and an oxirane oxygen content of 5.5 percent at a polymerizing temperature of about from 90° to 100° C. in the presence of naphthalene-β-sulfonic acid until a polymer having an oxirane oxygen content substantially below 5.5 percent is produced.

13. A process comprising heating a 9,10-epoxyoctadecanol having a melting point of 54° C. and an oxirane oxygen content of 5.5 percent at a polymerizing temperature of about from 90° to 100° C. in the presence of naphthalene-β-sulfonic acid until a polymer having an oxirane oxygen content of not more than about 0.3 percent is produced.

14. A process comprising heating a 9,10-epoxyoctadecanol having a melting point of 48° C. and an oxirane oxygen content of 5.6 percent at polymerizing temperature until a polymer having an oxirane oxygen content substantially below 5.6 percent is produced.

15. A process comprising heating a 9,10-epoxyoctadecanol having a melting point of 48° C. and an oxirane oxygen content of 5.6 percent at a polymerizing temperature of about from 90° to 100° C. until a polymer having an oxirane oxygen content substantially below 5.6 percent is produced.

16. A process comprising heating a 9,10-epoxyoctadecanol having a melting point of 48° C. and an oxirane oxygen content of 5.6 percent at a polymerizing temperature of about from 90° to 100° C. in the presence of naphthalene-β-sulfonic acid until a polymer having a oxirane oxygen content substantially below 5.6 percent is produced.

17. A process comprising heating a 9,10-epoxyoctadecanol having a melting point of 48° C. and an oxirane oxygen content of 5.6 percent at a polymerizing temperature of about from 90° to 100° C. in the presence of naphthalene-β-sulfonic acid until a polymer having an oxirane oxygen content of not more than about 0.3 percent is produced.

DANIEL SWERN.
GERALDINE N. BILLEN.

REFERENCES CITED

The following references are of record in the file of this patent:

UNITED STATES PATENTS

| Number | Name | Date |
| --- | --- | --- |
| 1,641,710 | Untiedt | Sept. 6, 1927 |
| 1,921,378 | Webel | Aug. 8, 1933 |
| 2,041,702 | Eatough | May 26, 1936 |